Figures 1, 2:
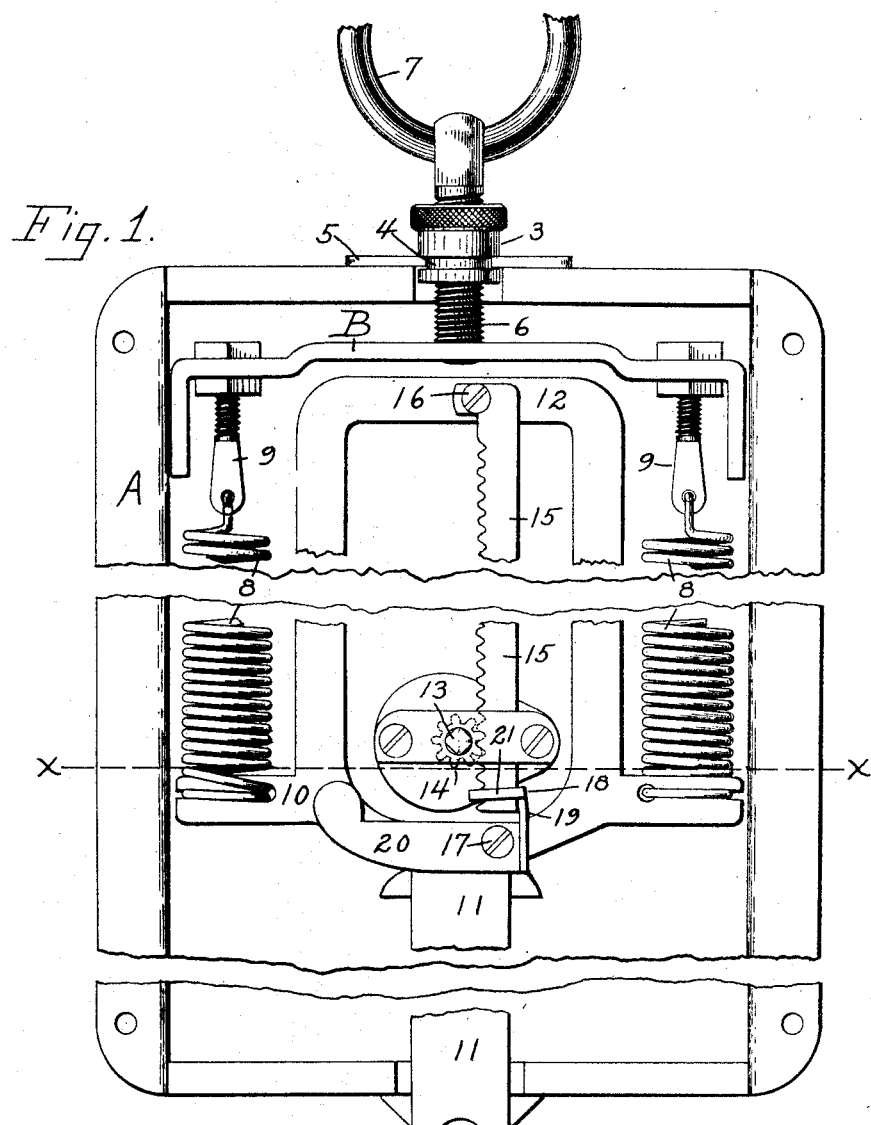

No. 813,735. PATENTED FEB. 27, 1906.
J. B. PAQUETTE.
SPRING SCALE.
APPLICATION FILED APR. 3, 1905.

Witnesses.
Fred E. Potter.
J. H. Towers.

Inventor.
John B. Paquette
By James Shepard.
Atty.

UNITED STATES PATENT OFFICE.

JOHN B. PAQUETTE, OF NEW BRITAIN, CONNECTICUT, ASSIGNOR TO LANDERS, FRARY & CLARK, OF NEW BRITAIN, CONNECTICUT, A CORPORATION.

SPRING-SCALE.

No. 813,735.  Specification of Letters Patent.  Patented Feb. 27, 1906.

Application filed April 3, 1905. Serial No. 253,570.

*To all whom it may concern:*

Be it known that I, JOHN B. PAQUETTE, a citizen of the United States, residing at New Britain, in the county of Hartford, in the State of Connecticut, have invented certain new and useful Improvements in Spring-Scales, of which the following is a specification.

My invention relates to improvements in spring-scales; and the object of my improvement is efficiency of operation, especially with reference to providing a durable, smooth, and uniform presser device for holding the rack in engagement with its pinion.

In the accompanying drawings, Figure 1 is a broken front elevation of my scales, the dial being removed. Fig. 2 is a sectional plan of parts thereof on the line $x$ $x$ of Fig. 1.

A designates the case, at the upper end of which is a nut 3, arranged to rotate freely, but held against longitudinal movement by means of its annular groove 4 and the plate 5, secured to or forming part of the case. The grooved portion of the said nut is engaged by the said plate. A cross-bar B has rigidly secured to it the central screw 6, to which the said nut 3 is fitted, the upper end of the said screw having connected therewith the ordinary suspension-ring 7. To the cross-bar B the upper ends of the counterbalancing-springs 8 are secured by ordinary connecting devices 9. The lower ends of the said springs are secured to the cross-head 10 of the slide, the said slide consisting of the draw-bar 11, cross-head 10, and upwardly-projecting extension 12. At the center of the case is the ordinary shaft 13 and pinion 14, while a rack 15 for engaging the said pinion is pivoted by the screw 16 to the upper end of the slide. The nut 3 and connected parts may be used as a tare adjustment. The parts thus far described are or may be of any ordinary construction, and therefore any ordinary spring-scale mechanism having a slide, rack, and pinion, with the rack pivoted to the slide by its upper end, may be substituted as an equivalent for the parts herein shown and thus far described.

To the slide I pivot on the pin or screw 17 the gravity-actuated presser device 18 for continually pressing upon the lower end of the rack with an even and gentle pressure to force the said rack toward the pinion and hold it in engagement therewith. The rack-engaging end of the presser device 18, as shown, is formed on the upper end of one arm 19 of an angle-lever, while the outer end of the other arm 20 of the said angle-lever forms the weight for actuating the presser device by gravity. In this case so much of the arm 20 as is not necessary for pivoting the presser device on the slide serves as means for forcing the presser device against the lower end of the rack. I also prefer to form the rack-engaging end of the presser device 18 with guards 21, that extend from the said device along the opposite broad sides of the rack, whereby there is no liability of the accidental displacement of the lower end of the rack relatively to the presser device.

The gravity-actuated presser device will effectually hold the rack in proper engagement with the pinion and with such a gentle and even pressure as not to interfere in the least with the action of the scale. It is also very durable and not liable to get out of order.

I have not shown or described a dial or indicator; but these may be of any ordinary construction and connected in any ordinary manner with the shaft and pinion.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. In spring-scales, the combination of a pinion with a slide extending upwardly above the said pinion, a rack pivotally mounted by its upper end to the said slide, and a presser device pivotally mounted on the said slide in position for engaging the said rack, and means for forcing the said pivotally-mounted presser device against the lower end of the said rack.

2. In spring-scales, the combination of a pinion with a slide extending upwardly above the said pinion, a rack pivotally mounted by its upper end to the said slide, and an angle-lever pivoted to the said slide near the lower end of the said rack, one arm of the said lever acting as a weight and the other arm acting as a presser device for holding the said rack in engagement with the said pinion.

JOHN B. PAQUETTE.

Witnesses:
C. P. BAILY,
F. H. FIELD.